US012623767B2

(12) United States Patent
Bryant et al.

(10) Patent No.: US 12,623,767 B2
(45) Date of Patent: May 12, 2026

(54) AIRCRAFT STRUCTURAL COMPONENT AND A METHOD OF FABRICATING AN AIRCRAFT STRUCTURAL COMPONENT

(71) Applicant: Airbus Operations Limited, Bristol (GB)

(72) Inventors: Stuart Bryant, Bristol (GB); Thomas Barnett, Bristol (GB)

(73) Assignee: Airbus Operations Limited, Filton (GB)

( * ) Notice: Subject to any disclaimer, the term of this patent is extended or adjusted under 35 U.S.C. 154(b) by 56 days.

(21) Appl. No.: 18/389,305

(22) Filed: Nov. 14, 2023

(65) Prior Publication Data

US 2024/0166326 A1 May 23, 2024

(30) Foreign Application Priority Data

Nov. 18, 2022 (GB) ...................................... 2217318

(51) Int. Cl.
| | |
|---|---|
| *B64C 1/06* | (2006.01) |
| *B64C 3/18* | (2006.01) |
| *B64F 5/10* | (2017.01) |

(52) U.S. Cl.
CPC .............. *B64C 1/064* (2013.01); *B64C 3/182* (2013.01); *B64F 5/10* (2017.01)

(58) Field of Classification Search
CPC ................................ B64C 1/064; B64C 3/182
See application file for complete search history.

(56) References Cited

U.S. PATENT DOCUMENTS

| | | | | | |
|---|---|---|---|---|---|
| 3,300,839 | A * | 1/1967 | Lichti | .................... | B21D 47/04 |
| | | | | | 52/840 |
| 5,848,765 | A * | 12/1998 | Gillespie | .................. | B64C 9/18 |
| | | | | | 244/131 |
| 7,818,945 | B2 * | 10/2010 | Gregg | ..................... | B64C 1/065 |
| | | | | | 52/840 |
| 7,841,152 | B2 * | 11/2010 | Young | ...................... | B23C 3/10 |
| | | | | | 52/749.1 |
| 8,795,567 | B2 * | 8/2014 | Bland | .................. | B29C 70/549 |
| | | | | | 264/258 |

(Continued)

FOREIGN PATENT DOCUMENTS

| | | |
|---|---|---|
| EP | 1800841 A1 | 6/2007 |
| WO | 2014031043 A1 | 2/2014 |

OTHER PUBLICATIONS

British Search Report for Application No. 2217318 dated Apr. 26, 2023.

*Primary Examiner* — Philip J Bonzell
(74) *Attorney, Agent, or Firm* — KDW Firm PLLC

(57) ABSTRACT

An aircraft structural component includes a flange having a non-planar side and a web having a first end extending from the non-planar side of the flange and a second end distal from the first end and from the non-planar side of the flange wherein the web has a non-planar shape that deviates from a plane normal to the non-planar side of the flange and extending in a longitudinal direction of the aircraft structural component, so that a deviation of the non-planar shape of the web from the plane increases with distance along the web in a direction from one of the first and second ends to the other of the first and second ends, and so that the deviation extends over at least 10 cm of a length of the aircraft structural component.

17 Claims, 7 Drawing Sheets

(56) References Cited

U.S. PATENT DOCUMENTS

| | | | |
|---|---|---|---|
| 9,242,393 B2 * | 1/2016 | Bland | B29C 33/38 |
| 11,505,301 B2 * | 11/2022 | Wadsworth | B29C 70/345 |
| 11,981,415 B2 * | 5/2024 | Wadsworth | B29C 70/86 |
| 2006/0237588 A1 * | 10/2006 | Kismarton | B64C 1/065 |
| | | | 52/840 |
| 2007/0022707 A1 * | 2/2007 | Gregg | E04C 3/07 |
| | | | 52/837 |
| 2007/0138695 A1 * | 6/2007 | Krogager | B29C 70/462 |
| | | | 244/119 |
| 2010/0043231 A1 * | 2/2010 | Young | B23C 3/10 |
| | | | 29/897 |
| 2012/0076989 A1 * | 3/2012 | Bland | B64C 1/064 |
| | | | 264/219 |
| 2014/0322381 A1 * | 10/2014 | Bland | B29C 33/76 |
| | | | 425/470 |
| 2021/0155336 A1 * | 5/2021 | Wadsworth | B64F 5/10 |
| 2023/0038291 A1 * | 2/2023 | Wadsworth | B64C 3/182 |

* cited by examiner

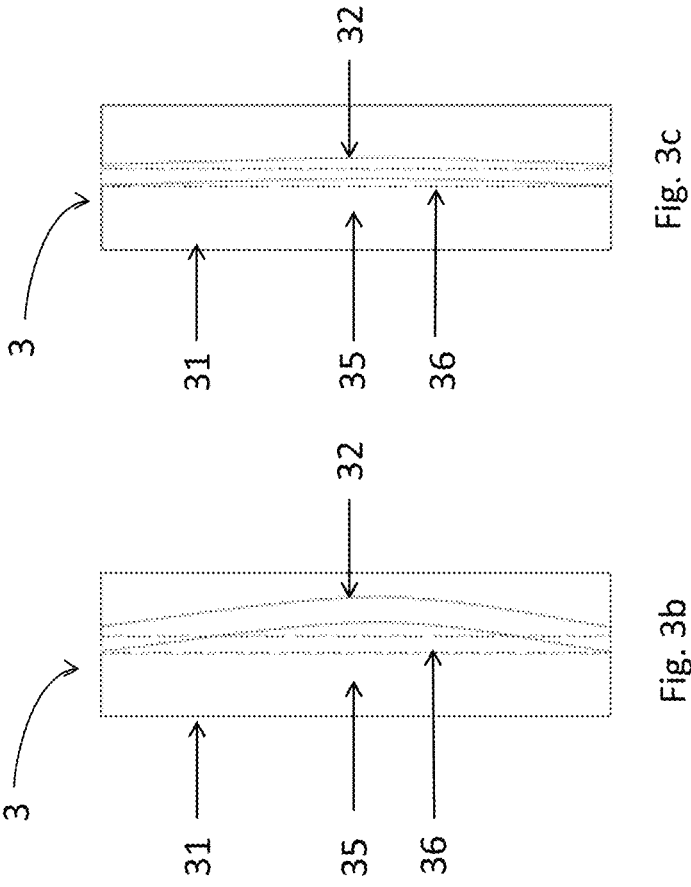
Fig. 3c
Fig. 3b
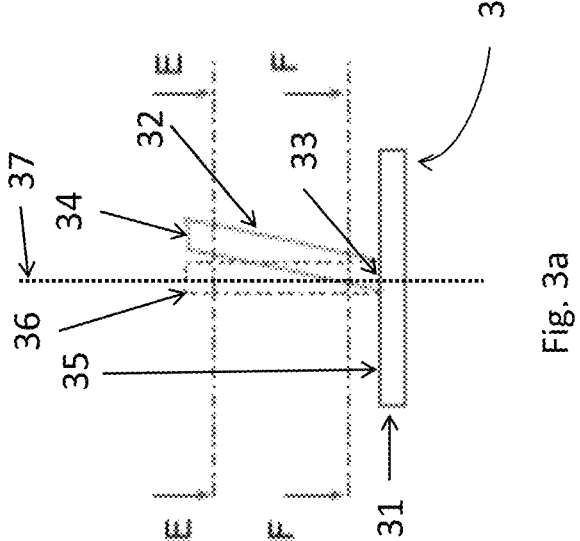
Fig. 3a

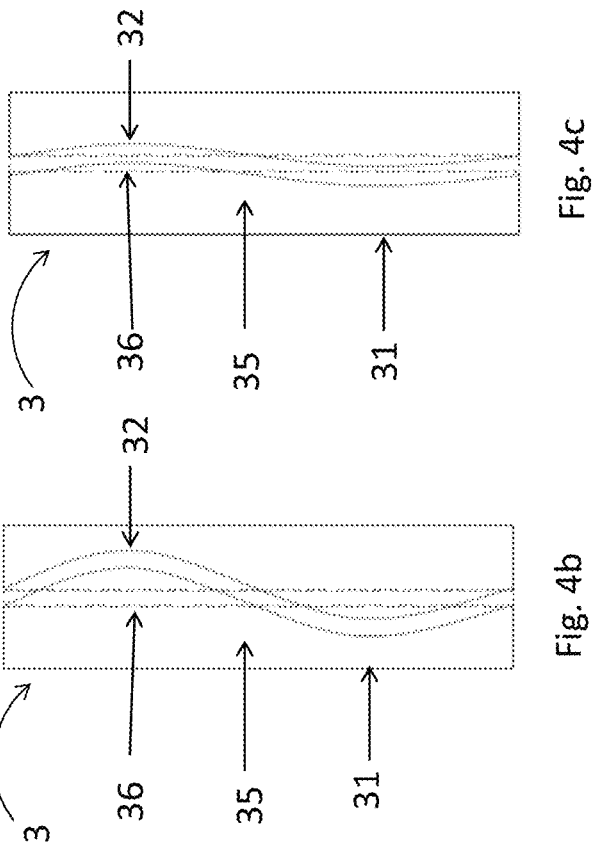
Fig. 4b
Fig. 4c
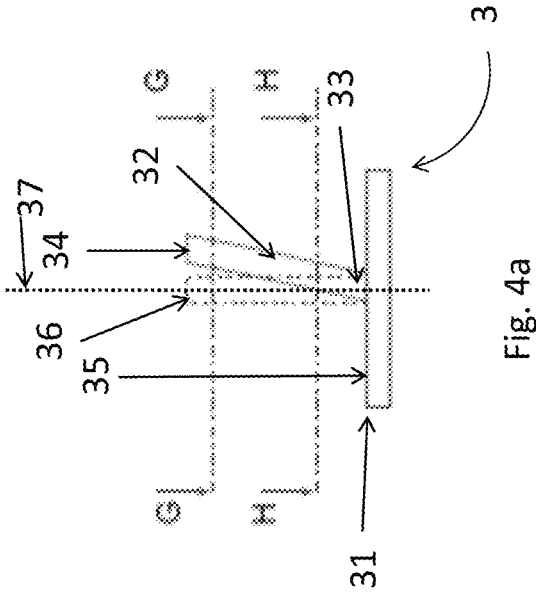
Fig. 4a

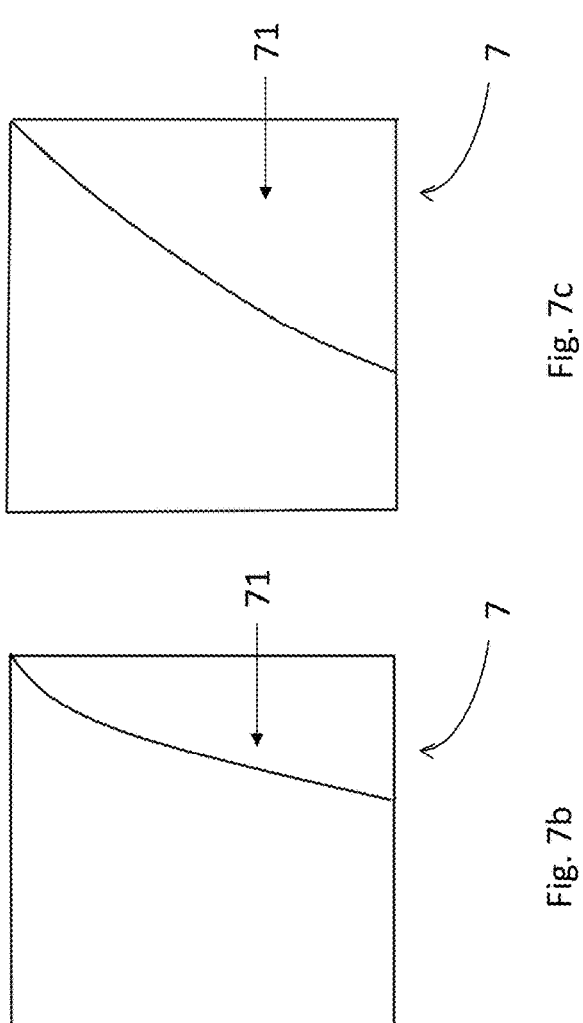
Fig. 7c
Fig. 7b
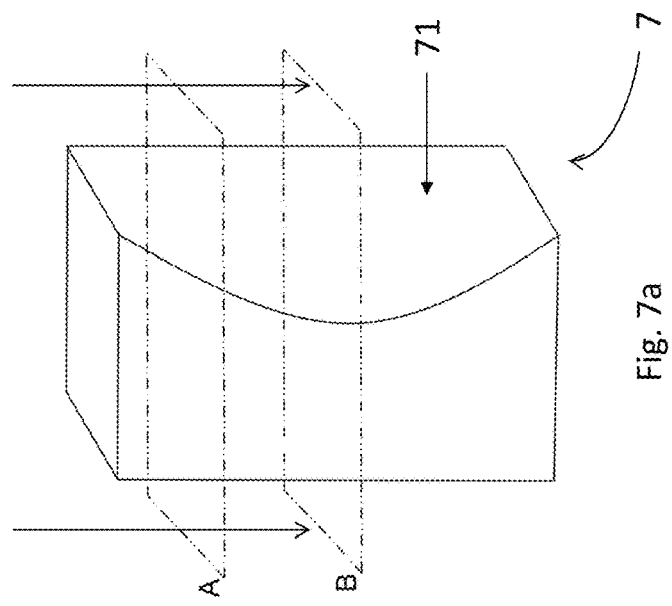
Fig. 7a

AIRCRAFT STRUCTURAL COMPONENT AND A METHOD OF FABRICATING AN AIRCRAFT STRUCTURAL COMPONENT

TECHNICAL FIELD

The disclosure herein relates to aircraft structural components, such as stringers, and to methods of fabricating aircraft structural components.

BACKGROUND

In an aircraft, a curved shape is desirable for aerodynamic and weight saving purposes in some parts such as the wings or the fuselage. These parts normally comprise a skin at the surface. The skin is curved to accommodate or provide the required shape. The curved skin requires structural supports to be attached to it in order to have the structural rigidity suitable to withstand the severe demands of the operating conditions of the aircraft, such as the pressure in the cabin or the lift forces on the wing. The structural supports are thus subject to strict quality requirements.

It is desirable to provide aircraft parts with tight curvature. Doing so will reduce the design constrains and permit, for example, aircraft design closely inspired by natural shapes. Such aircraft parts in turn require structural supports with the desired curvature while complying with the property criteria for application in aircraft.

SUMMARY

A first aspect of the disclosure herein provides an aircraft structural component, comprising: a flange having a non-planar side; and a web having a first end, which extends from the non-planar side of the flange, and a second end, which is distal from the first end and from the non-planar side of the flange; wherein the web has a non-planar shape that deviates from a plane, which is normal to the non-planar side of the flange and extends in a longitudinal direction of the component, so that a deviation of the non-planar shape of the web from the plane increases with distance along the web in a direction from one of the first and second ends to the other of the first and second ends, and so that the deviation extends over at least 10 cm of a length of the component.

Introducing the deviation into the web of the component deliberately allows the tailoring of the deviation to the application desired for each individual component. This may improve the mechanical properties of the component, such as the ability of the component to sufficiently support another element, such as an aircraft skin, in use. It may additionally or alternatively better enable the component to have acceptable dimensions or uniformity with other like components. In the absence of such a deliberate and controlled deviation, one or more wrinkles may be formed upon forming of the web from a sheet material and thereafter bending the sheet material to form the component. This is due to the difference in length of the arcs at the inner and outer radii of curvature of the web, which result in excess material that needs to be accommodated. This is especially a problem where components are required to be bent to take their webs considerably out of a flat plane, i.e., have a small radius of curvature at one or other end of the web.

Optionally, the non-planar side of the flange is a curved side, or a substantially curved side such as a plurality of flat surfaces arranged to approximate an arc. Optionally, the non-planar side of the flange is a concave side, or a substantially concave side such as a plurality of flat surfaces arranged to approximate a concavity. In such concave arrangements, the deviation of the non-planar shape of the web from the plane increases with distance along the web in a direction from the first end to the second end.

Optionally, the non-planar shape of the web deviates from the plane by a constantly increasing amount along the length of the aircraft structural component from a first point along the length of the aircraft structural component to a second point along the length of the aircraft structural component. The deviation may, for example, reach one or plural maximums at respective points along the length of the component. There may, for example, be only a single maximum deviation at an approximately halfway point along the length of the component, so that the web forms a bow-like shape, or plural maximum deviations at two respective points along the length, so that the web forms an S-like shape.

The non-constant size of the deviation along the length of the component enables the accommodation of excess material generated by forming the web from a rectangular piece of material while requiring the web to follow the non-planar shape of the flange, without incurring wrinkles in the web.

Optionally, the first end of the web and the second end of the web are of equal length. This permits the web to be provided from a rectangular piece of material as a way of simplifying the manufacturing process. This in turn may provide cost benefits and increased flexibility of tooling equipment, as the material is usable easily to form differently shaped final components.

Optionally, the non-planar shape of the web deviates from the plane by a constantly increasing amount with distance along the web in the direction from the first end to the second end. This may better accommodate the material of the web, while avoiding wrinkles, over the full extent of the web between the first and second ends thereof.

Optionally, the non-planar shape defines at least one sine wave having an amplitude and a wavelength such that: the deviation of the non-planar shape of the web from the plane increases with distance along the web from the first end to the second end, and the wavelength is at least 20 cm. A sine wave represents a more controlled and regular shape than an incidentally occurring wrinkle, which makes the properties of the web more predictable. A sine wave profile is smooth with no sudden or point changes of direction, which is desirable to minimise stress concentration which may occur if sharp edges or changes in direction are present.

The wavelength may be tailored to the component based on the desired length and shape of the final component. A longer wavelength is desirable in order to distribute the material of the web, which would have otherwise formed a wrinkle along a greater length than the wrinkle would span. The wrinkle, if it has a high frequency, introduces points of stress concentration, which are detrimental to the mechanical properties of the component. The wrinkle also forms in an uncontrolled manner and hence can appear in different shapes, reducing the uniformity between components. Forming the excess web material into a predetermined shape, such as a sine wave, in a controlled manner ensures predictability of properties and prevents stress concentration and subsequent degradation to mechanical properties and reliability of the component.

Optionally, the web is made from a fiber composite material, such as for example glass fiber reinforced composite or carbon fiber reinforced composite.

Optionally, the deviation of the non-planar shape is zero at the first end of the web. This can facilitate attachment of the web to the flange.

Optionally, at least one portion of the web is perpendicular to the flange. This is to provide, for example, a simpler way of affixing the component to other portions of the aircraft structure, a profile that permits use of a simple bracket to reinforce the web relative to the flange, or to accommodate other configurational demands, such as a need for the component to pass through a rib cut-out.

Optionally, at least one of the at least one portion of the web is located at a longitudinal end of the web.

Optionally, at least one of the at least one portion of the web is located part way along a length of the web.

Optionally, the structural component is an aircraft stringer, such as a stringer to which a skin section of a wing or a fuselage is to be attached for structural support. Stringers are conventionally curved through large radii where wrinkles in the material of the web of the stringer are avoided due to the inherent small degree of "play" in the material, allowing the material to stretch or resize sufficiently to avoid wrinkling. If stringers with tighter curvature are desired, embodiments of the disclosure herein enable them to be provided to a satisfactory standard.

A second aspect of the disclosure herein provides an aircraft structural assembly, comprising the aircraft structural component according to the first aspect and a skin section affixed to the flange of the aircraft structural component. This may be achieved by, for example, attaching the flange of the aircraft structural component, at the face opposite to the non-planar side, to the skin section. This may be done by mechanical fasteners, such as bolts or rivets, or using a welding process (if the flange is of a weldable material) or an adhesive process or any other suitable method. The assembly may, for example, be a wing and/or a fuselage of the aircraft. Wings and fuselages are examples of aircraft structural assemblies with curvature where structural support is required. The assembly provides particular advantages, at least in enabling desired curvature to be achieved.

A third aspect of the disclosure herein provides an aircraft comprising an assembly according to the second aspect. An aircraft with curved portions unachievable by known methods may be fabricated through implementation of the disclosure herein, as the shape of the assembly, for example the wing or the fuselage, is not so limited by the curvature restrictions previously imposed. This may result in more optimal tailoring of the shape of the assembly for aerodynamic or lift properties, structural resilience, weight savings or other benefits.

A fourth aspect of the disclosure herein provides a method of fabricating an aircraft structural component, the method comprising: providing a flange having a non-planar side; and providing a web having a first end, which extends from the non-planar side of the flange, and a second end, which is distal from the first end and from the non-planar side of the flange; wherein the web has a non-planar shape that deviates from a plane, which is normal to the non-planar side of the flange and extends in a longitudinal direction of the component, so that a deviation of the non-planar shape of the web from the plane increases with distance along the web from one of the first and second ends to the other of the first and second ends, and so that the deviation extends over at least 10 cm of a length of the component.

The method permits the fabrication of the aircraft structural component according to the first aspect, such that wrinkling produced by alternative known methods can be avoided by controlled accommodation of the excess material of the web. This permits components of smaller radius of curvature to be manufactured while maintaining satisfactory properties for use in aircraft.

Optionally, the providing the web comprises use of a tool with a non-planar (e.g. curved) profile to impart the non-planar shape to the web when material to define the web is laid up on the non-planar profile of the tool. Such non-planar tooling may be used as a way to achieve the method and an embodiment of the disclosure herein. Optionally, the non-planar tooling may be employed in the laying up of the aircraft structural component, to form the component in the desired final shape. Optionally, an alternative method may comprise forming the component flat which may then be formed against the curved tooling.

Optionally, the non-planar profile of the tool is such that the material to define the web, when laid on the tool, defines a sine wave having an amplitude and a wavelength such that: the deviation of the non-planar shape of the web from the plane increases with distance along the web from the first end to the second end, and the wavelength is at least 20 cm.

Optionally, the material to define the web is rectangular. This is to simplify the method as less shaping or cutting is required in the process.

Optionally, the method comprises curing the web when the web is on the tool. This aids retention of the desired shape of the web during curing.

Optionally, the deviation is chosen according to one or more parameters, the one or more parameters optionally comprising any one or more of: a final length of the aircraft structural component, a required radius of the non-planar side of the flange, a required distance from the first end to the second end of the web, a required configuration of the aircraft structural component in the aircraft, and an intended function of the aircraft structural component in the aircraft. This may be achieved by, for example, modifying the deviation shape, including, for example, the wavelength and amplitude in the sine wave embodiments, by selection of the curved tooling fit to impart such shape.

Optionally, the aircraft structural component is a stringer.

Optional features of aspects of the disclosure herein may be applied equally to other aspects of the disclosure herein, where appropriate.

BRIEF DESCRIPTION OF THE DRAWINGS

Embodiments of the disclosure herein will now be described, by way of example only, with reference to the accompanying drawings.

FIGS. 3*a*, 3*b* and 3*c* show, respectively, a first cross-sectional end view of an aircraft structural component according to an embodiment of the disclosure herein, and two further cross-sectional views taken along the lines E-E and F-F, respectively, in FIG. 3*a*.

FIGS. 4*a*, 4*b* and 4*c* show, respectively, a first cross-sectional end view of an aircraft structural component according to another embodiment of the disclosure herein, and two further cross-sectional views taken along the lines G-G and H-H, respectively, in FIG. 4*a*.

FIG. 7a shows a schematic perspective view of a tool for use in example of the method according to the disclosure herein, and FIGS. 7b and 7c show cross-sectional views taken at planes A and B, respectively, in FIG. 7a.

DETAILED DESCRIPTION

It is known in a comparative example for aircraft structural components such as stringers to suffer from unacceptable levels of wrinkling in webs, when fabricated with small-radii curvatures. As previously outlined, small-radius curvature in structural components may be desirable to support the skin in small-radius curved aircraft parts, which seek to improve the overall performance of the aircraft. In comparative manufacturing techniques for a curved stringer comprising a flange and a web extending from the flange, for example, wrinkling can occur in the web during bending of the stringer following laying up of the web in a flat rectangular state. This wrinkling is due to a difference in length of the proximal and distal (relative to the flange) ends of the web after bending, which results in an excess of web material of the bent component at the inner, or smaller, radius end of the web. Wrinkling would be detrimental to the performance of the structural components, and so avoiding or minimizing such wrinkles has until now been a limitation on the achievable curvature in aircraft components. A wrinkle or wrinkling can be considered a deviation, over a short distance of, for example, less than 10 cm, or less than 5 cm, or even less than 10 mm in the direction of the length of the component, of the web from its remaining general profile or path. Some such wrinkles or wrinkling may comprise folds in the web.

Embodiments of the disclosure herein seek to overcome the issue of wrinkling in such components by effectively controlling the excess material generated in forming a bent component and distributing it over a longer span (i.e. at least 10 cm) of the component in a manner which maintains acceptable properties of the structural component. This reduces the likelihood of harmful points of stress concentrations, which could otherwise present an unacceptable level of failure risk. It also results in improved consistency of component manufacture.

Figure 1:
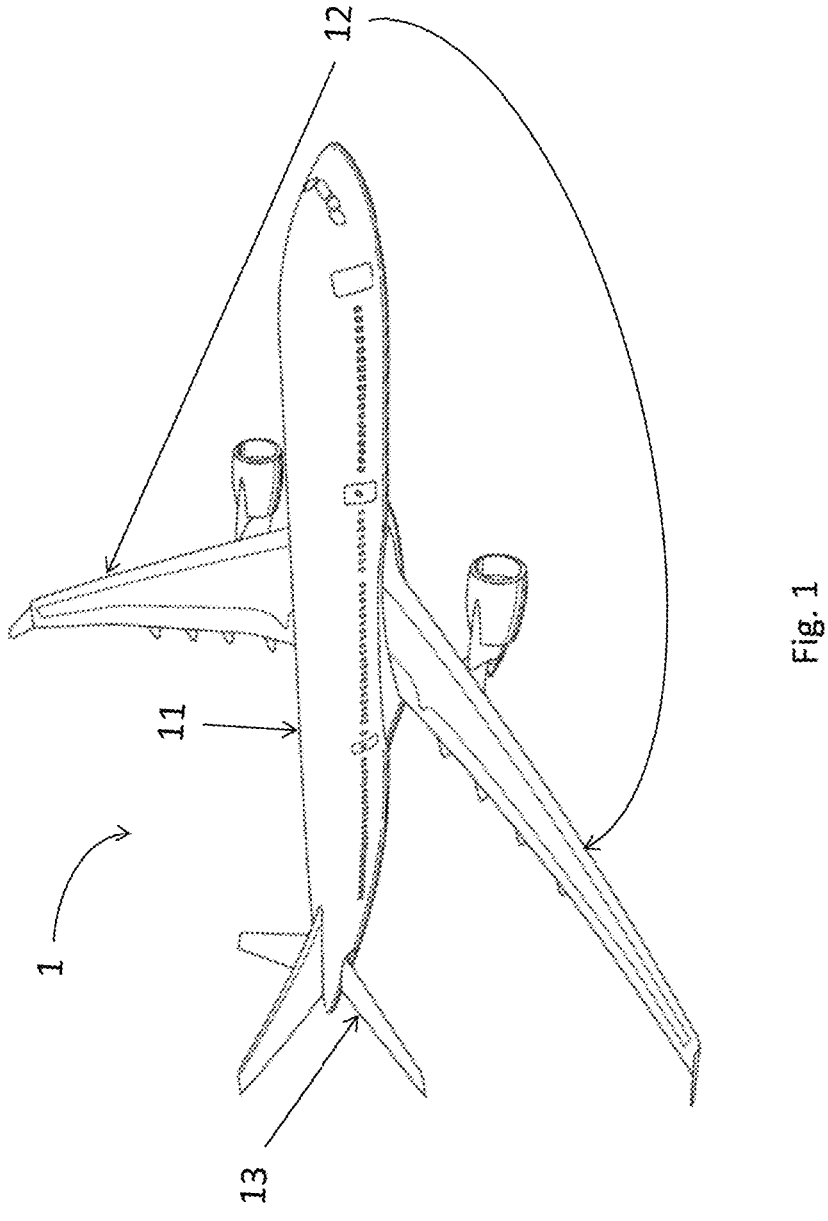
FIG. 1 shows a schematic view of an aircraft according to an example of the disclosure herein.

FIG. 1 shows an example of an aircraft 1 according to an example of the disclosure herein. The aircraft has multiple structural assemblies that may benefit from design unrestricted by curvature limits. Such assemblies are included in the fuselage 11, the wings 12, and the tail 13.

Figure 2:
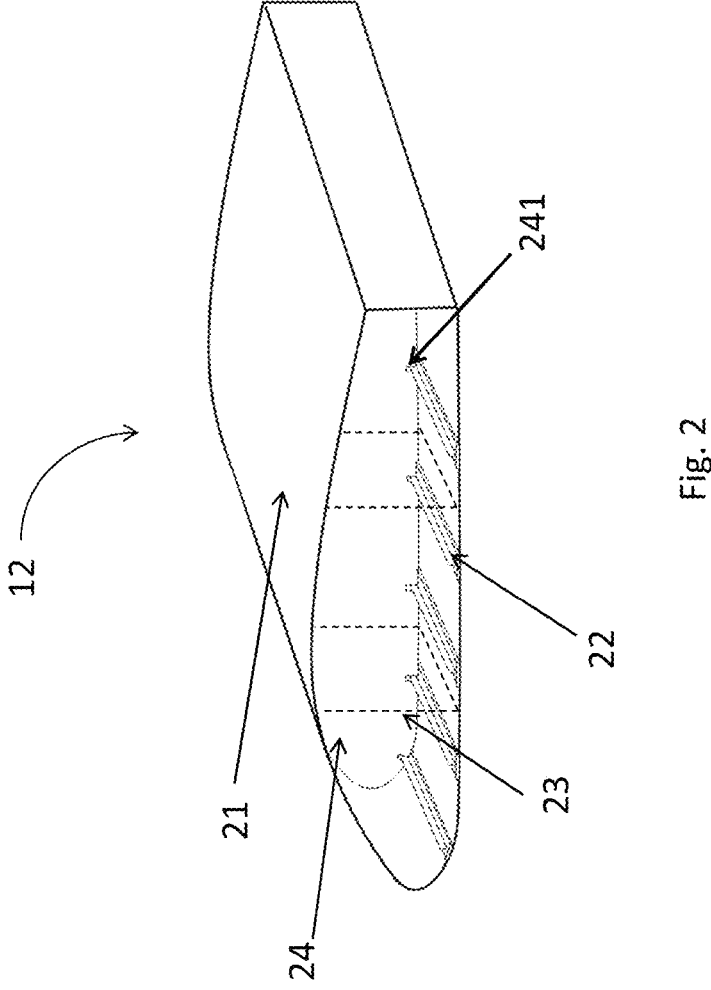
FIG. 2 shows an aircraft structural assembly according to an example of the disclosure herein.

A cross section through one of the wings 12 of the aircraft 1 is shown in FIG. 2. The wing 12 comprises a skin 21 defining its outer surface, spars 23 and ribs 24 (only one of which is visible in FIG. 2) supporting the skin 21, and a series of stringers 22. The rib 24 has openings 241 to accommodate the stringers passing through the opening.

Figure 5C:
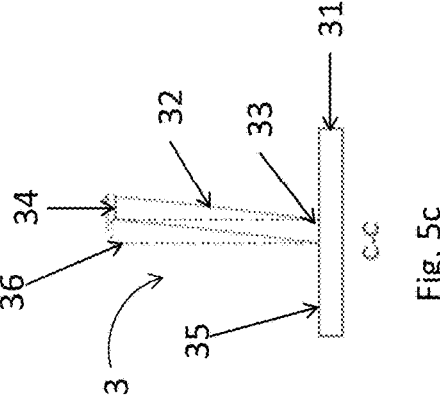
FIG. 5*a* shows a schematic side view of the aircraft structural component of FIG. 3*a*, and FIGS. 5*b* and 5*c* show cross-sectional views taken along the lines B-B and C-C, respectively, in FIG. 5*a*.
Figure 5B:
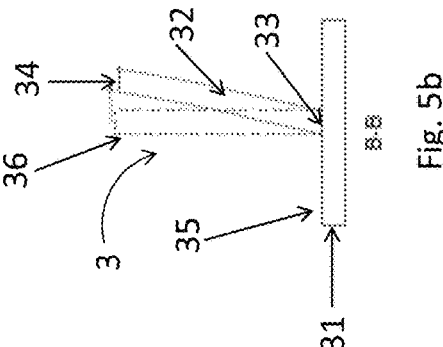
Figure 5A:
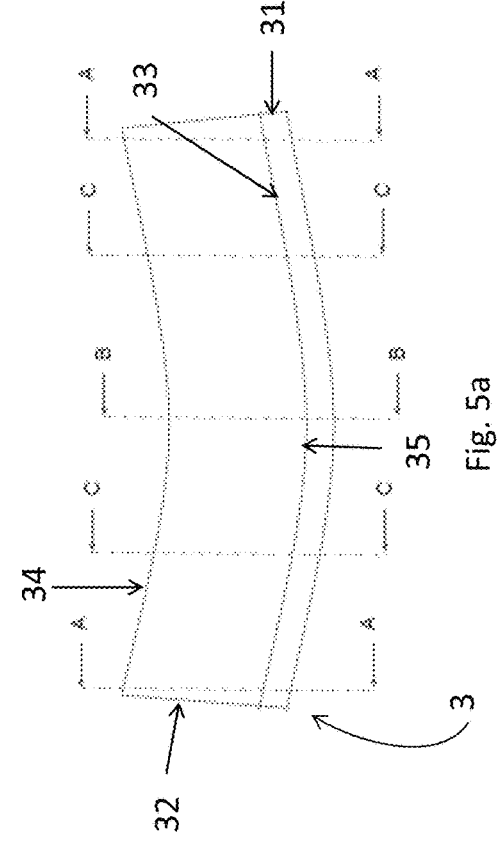

FIGS. 3a-3c and 5a-5c show an example T-shaped stringer 3, which is utilized in the wing 12. The stringer 3 comprises a flange 31 and a web 32 extending from the flange 31. The stringer 3 is curved in such a way that the flange 31 has a concave side 35 from which the web 32 extends, as is best shown in FIG. 5a. A first end 33 of the web 32 is attached to the concave side 35 of the flange 31, and the web 32 has an opposite second end 34 that is distal from the flange 31 and from the first end 33 of the web 32.

Notably, the web 32 has a non-planar shape. By way of comparison, a dashed outline of a theoretical comparable planar web 36 is shown in FIGS. 3a to 3c.

The non-planar shape of the web 32 deviates from a plane 37, shown in a dotted line, which is normal to the concave side of the flange 31 and extends in a longitudinal direction of the stringer 3. This longitudinal direction is into the page as FIG. 3a is drawn. The deviation is zero where the web 32 meets the flange 31 at the first end of the web 33 and increases constantly with distance along the web 32 from the flange 31, as best shown with reference to FIGS. 3b, 3c, 5b and 5c. Moreover, the deviation extends over a full length of the stringer 3 which, in this example, is 1 meter. In other examples, the length of the stringer 3 may of course be more or less than this figure, such as in a range of 1 meter to 30 meters. The shape of the web 32 is such that the web 32 deviates from the plane by a constantly increasing amount along the length of the stringer from either end of the stringer 3 to a mid-point of the stringer 3, as best shown in FIGS. 3b and 3c.

As discussed in more detail below, the web 32 is made from one or more rectangular pieces of material, which in this example is a fiber composite material. In other words, were the piece(s) of the web material to be laid out flat before forming into the web 32, it/they would be rectangular. The first 33 and second 34 ends, or long edges, of the web 32 are therefore of equal, or substantially equal, length. Were it not for the controlled spread of the deviation of the web 32 from the plane over at least 10 cm of the length of the stringer 3, the excess material of the web 32 could form much more concentrated deviations or wrinkles at points along its length, resulting in the disadvantages discussed above.

In this embodiment, the non-planar shape of the web 32 defines a sine wave having a wavelength equal to double the length of the stringer 3. As will be appreciated from consideration of FIGS. 3b, 3c, 5b and 5c, an amplitude of deviation of the sine wave from the plane constantly increases along the web 32 from the first end of the web 32 to the second end of the web 32. Therefore, as shown in FIG. 3b, the sine wave in the web 32, sectioned at the E-E line, is of a greater amplitude than in FIG. 3c, where it is sectioned at the F-F line. This allows the (greater amount of) excess material generated during bending of the stringer 3 to be accommodated at the innermost radius, which occurs at the second end 34 of the web 32 in this example. As will also be appreciated from FIGS. 3b and 3c, the longitudinal ends of the web 32 are perpendicular to the flange 31. This can aid fixing of the stringer 3 to other structures in the wing 12.

Another stringer 3 embodying the disclosure herein is shown in FIGS. 4a to 4c, in which like reference numerals are used to indicate like components to those in FIGS. 3a-3c. The stringer 3 is the same as that shown in FIGS. 3a-3c, except the wavelength of the sine wave defined by the non-planar shape of the web 32 is equal to the length of the stringer 3. Accordingly, in addition to having longitudinal ends of the web 32 that are perpendicular to the flange 31, the longitudinal midpoint of the web 32 is also perpendicular to the flange 31. This midpoint of the web 32 is therefore relatively easy to align with, and mate with, an opening 241 in one of the ribs 24 discussed above, which opening 241 thus can be formed similarly perpendicularly to the section of the skin 21 to be attached to the flange 31 of the stringer 3.

The embodiments shown in FIGS. 3a to 5c are only examples and are not the only configurations of the aircraft structural component possible. Other embodiments may have sine waves of wavelengths other than an integer multiple of the web. Equally, non-planar shapes of the web 32 other than an exact sine wave are possible. Some will be generally rounded or undulating, but may not have a repeating wavelength or constant amplitude along the length of the web 32. Moreover, some exemplary aircraft structural components will have flanges of different shapes to those shown, such as bent to a different degree and/or L-shaped rather than T-shaped.

Figure 6:
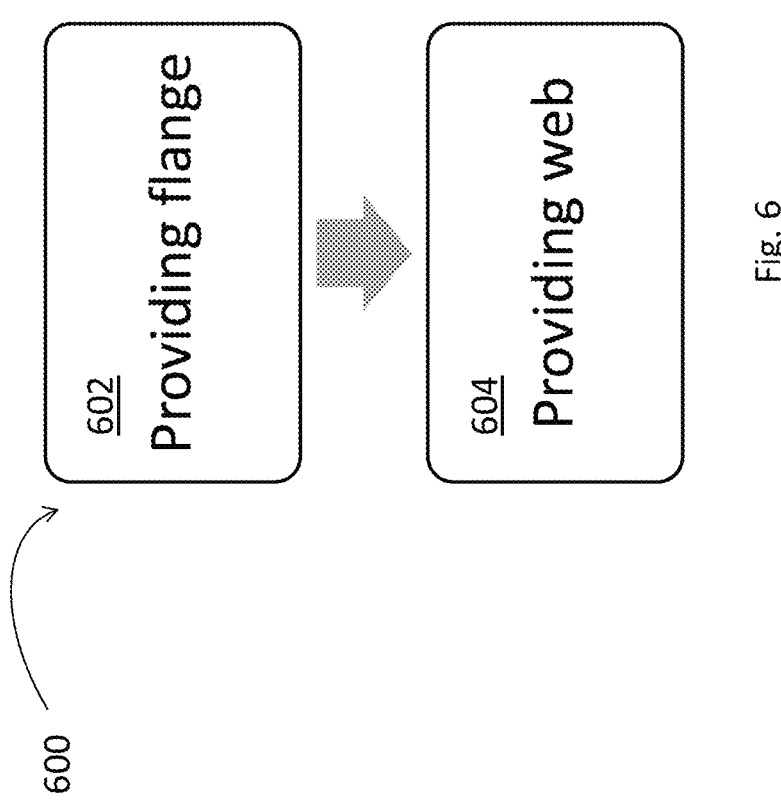
FIG. 6 shows a schematic view of a method according to an example of the disclosure herein.

The disclosure herein also provides a method of fabricating an aircraft structural component, such as a stringer, for use in an aircraft, as shown in FIG. 6.

The method 600 comprises providing 602 a flange having a non-planar side; and providing 604 a web having a first end, which extends from the non-planar side of the flange, and a second end, which is distal from the first end and from the non-planar side of the flange. The web has a non-planar shape that deviates from a plane, which is normal to the non-planar side of the flange and extends in a longitudinal direction of the aircraft structural component, so that a deviation of the non-planar shape of the web from the plane increases with distance along the web in a direction from one of the first and second ends to the other of the first and second ends, and so that the deviation extends over at least 10 cm of a length of the component. The blocks 602 and 604 of the method 600 may be performed concurrently or one after the other (in either order). The method is usable to fabricate the exemplary stringers 3 discussed above, and it will now be discussed in the context of making one of those stringers 3.

The blocks 602, 604 comprise laying up, on a tool 7, sheets of fiber composite material that will define the flange 31 and the web 32 of the stringer 3. Part of the tool 7 of this example is shown in FIGS. 7*a*-7*c*. As can be seen, the tool 7 has a non-planar profile 71 to impart the non-planar shape to the web 32 when the material to define the web 32 is laid on the non-planar profile 71. In this example, the non-planar profile 71 comprises a curved surface of the tool 7. Cross sections of the tool 7 at planes marked in dashed lines, plane A and plane B, are shown in FIG. 7*b* and FIG. 7*c*, respectively, viewed from top-down along the arrows shown, to aid visualise the shape of the non-planar profile 71.

The material to define the web 32 is rectangular to begin with. Once laid on the non-planar profile 71 of the tool 7, the material follows the shape of the non-planar profile 71, so as to define the sine wave discussed above. The non-planar profile 71 of the tool 7 is determined and formed based on the desired deviation of the non-planar shape of the web 32 from the plane normal to the non-planar side of the flange 31 discussed above. In turn, the deviation is chosen according to the following parameters: a final length of the stringer 3, a required radius of the curved side of the flange 31, a required distance from the first end to the second end of the web 32, and the intended configuration and function of the stringer 3 in the aircraft.

The part of the tool 7 on which the flange 31 is formed is not shown in FIG. 7, but it will have surface features suitable for ensuring that the associated fiber composite material adopts the desired curved shape of the flange 31.

Once the fiber materials are laid on the tool 7, the flange 31 and the web 32 are cured to set the stringer 3 in its final shape and to impart rigidity. The curing adheres the materials of the flange 31 and the web 32 to each other. As will be understood by the skilled person, the parameters for curing the stringer 3, and whether it is required as such, is determined by the material(s) used to make the flange 31 and the web 32 and whether further shaping stages are necessary at a later point.

While stringers 3, and their formation, for use in a wing of an aircraft have been discussed in detail, it will be appreciated that embodiments of the disclosure herein have utility in stringers or other structural components in the fuselage, the tail, or other parts of an aircraft.

It is to be noted that the term "or" as used herein is to be interpreted to mean "and/or", unless expressly stated otherwise.

It should be understood that modifications, substitutions and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structural component, comprising:
a flange having a non-planar side; and
a web comprising:
    a first end, which extends from the non-planar side of the flange;
    a second end, which is distal from the first end and from the non-planar side of the flange; and
    a non-planar shape that deviates from a plane, which is normal to the non-planar side of the flange and extends in a longitudinal direction of the aircraft structural component;
wherein the non-planar shape defines at least one sine wave that has an amplitude and a wavelength;
wherein the wavelength is at least 20 centimeters (cm);
wherein a deviation of the non-planar shape of the web from the plane increases with distance along the web in a direction from the first end to the second end; and
wherein the deviation of the non-planar shape of the web from the plane extends over at least 10 cm of a length of the aircraft structural component.

2. The aircraft structural component of claim 1, wherein the non-planar shape of the web deviates from the plane by a constantly increasing amount along the length of the aircraft structural component from a first point along the length of the aircraft structural component to a second point along the length of the aircraft structural component.

3. The aircraft structural component of claim 1, wherein the first end of the web and the second end of the web are of equal length.

4. The aircraft structural component of claim 1, wherein the non-planar shape of the web deviates from the plane by a constantly increasing amount with distance along the web in a direction from the first end to the second end.

5. The aircraft structural component of claim 1, wherein the web is made from a fiber composite material.

6. The aircraft structural component of claim 1, wherein the deviation is zero at the first end of the web.

7. The aircraft structural component of claim 1, wherein the aircraft structural component is a stringer.

8. The aircraft structural component of claim 1, wherein at least one portion of the web is perpendicular to the flange.

9. The aircraft structural component of claim 8, wherein at least one of the at least one portion of the web is located at a longitudinal end of the web.

10. The aircraft structural component of claim 8, wherein at least one of the at least one portion of the web is located part way along a length of the web.

11. An aircraft structural assembly, comprising:

the aircraft structural component of claim 1; and a skin section affixed to the flange of the aircraft structural component.

12. An aircraft comprising the aircraft structural assembly of claim 11.

13. A method of fabricating an aircraft structural component for an aircraft, the method comprising:

providing a flange having a non-planar side; and providing a web comprising:

a first end, which extends from the non-planar side of the flange;

a second end, which is distal from the first end and from the non-planar side of the flange; and a non-planar shape that deviates from a plane, which is normal to the non-planar side of the flange and extends in a longitudinal direction of the aircraft structural component;

wherein a deviation of the non-planar shape of the web from the plane increases with distance along the web in a direction from the first end to the second end, a magnitude of the deviation from the plane increasing as a function of distance along a height of the web, from the first end to the second end;

wherein the deviation of the non-planar shape of the web from the plane extends over at least 10 cm of a length of the component;

wherein the providing the web comprises use of a tool with a non-planar profile to impart the non-planar shape to the web when material to define the web is laid on the tool;

wherein the non-planar profile of the tool is such that the material to define the web, when laid on the tool, defines at least one sine wave that has an amplitude and a wavelength; and wherein the wavelength is at least 20 centimeters (cm).

14. The method of claim 13, wherein the material to define the web is rectangular.

15. The method of claim 13, comprising curing the web when the web is on the tool.

16. The method of claim 13, wherein the deviation is chosen according to one or more parameters, the one or more parameters comprising any one or more of:

a final length of the aircraft structural component;

a required radius of the non-planar side of the flange;

a required distance from the first end to the second end of the web;

a required configuration of the aircraft structural component in the aircraft; and an intended function of the aircraft structural component in the aircraft.

17. The method of claim 13, wherein the aircraft structural component is a stringer.

* * * * *